United States Patent
Marupaduga

(10) Patent No.: US 10,085,222 B1
(45) Date of Patent: Sep. 25, 2018

(54) WIRELESS COMMUNICATION SYSTEM TO CONTROL TRANSMIT POWER FOR A WIRELESS REPEATER CHAIN

(71) Applicant: Sprint Communications Company L.P., Overland Park, KS (US)

(72) Inventor: Sreekar Marupaduga, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/497,435

(22) Filed: Apr. 26, 2017

(51) Int. Cl.
| | | |
|---|---|---|
| *H04W 52/46* | (2009.01) | |
| *H04W 52/24* | (2009.01) | |
| *H04W 24/08* | (2009.01) | |
| *H04W 64/00* | (2009.01) | |
| *H04W 72/04* | (2009.01) | |
| *H04W 52/38* | (2009.01) | |
| *H04L 12/26* | (2006.01) | |
| *H04W 88/08* | (2009.01) | |

(52) U.S. Cl.
CPC ......... *H04W 52/46* (2013.01); *H04L 43/0882* (2013.01); *H04W 24/08* (2013.01); *H04W 52/243* (2013.01); *H04W 52/386* (2013.01); *H04W 64/003* (2013.01); *H04W 72/0453* (2013.01); *H04W 88/08* (2013.01)

(58) Field of Classification Search
CPC .. H04W 52/46; H04W 88/04; H04B 7/15535; H04B 7/15542
See application file for complete search history.

(56) References Cited

U.S. PATENT DOCUMENTS

| | | | | |
|---|---|---|---|---|
| 7,218,891 | B2* | 5/2007 | Periyalwar | H04B 7/155 455/11.1 |
| 8,385,264 | B2 | 2/2013 | Baldemair et al. | |
| 9,100,092 | B2 | 8/2015 | Sawai | |
| 2003/0123401 | A1* | 7/2003 | Dean | H04B 7/15535 370/318 |
| 2004/0160928 | A1* | 8/2004 | Perlman | H04L 63/0428 370/338 |
| 2005/0174960 | A1* | 8/2005 | Perlman | H04W 88/04 370/328 |
| 2006/0041680 | A1* | 2/2006 | Proctor, Jr. | H04B 7/15542 709/238 |
| 2007/0071128 | A1* | 3/2007 | Meir | H03G 3/3042 375/297 |
| 2010/0056061 | A1* | 3/2010 | Luo | H04W 52/146 455/63.1 |
| 2010/0138549 | A1* | 6/2010 | Goel | H04W 52/0225 709/228 |
| 2010/0284446 | A1* | 11/2010 | Mu | H04B 7/15521 375/211 |

(Continued)

*Primary Examiner* — Devan Sandiford

(57) ABSTRACT

A wireless communication system to control the transmit power for a wireless repeater chain. The method includes a wireless access point wirelessly exchanging data with User Equipment (UEs) over the wireless repeater chain. The method also includes the wireless access point determining interference levels for wireless access points in neighboring cells, and when the interference levels for at least one of the wireless access points in the neighboring cells exceeds an interference threshold, then the method includes the wireless access point decreasing the transmit power of the wireless repeater chain.

16 Claims, 6 Drawing Sheets

(56) References Cited

U.S. PATENT DOCUMENTS

| | | | | |
|---|---|---|---|---|
| 2011/0110261 A1* | 5/2011 | Frenger | .............. | H04B 7/15542 370/252 |
| 2011/0177823 A1* | 7/2011 | Miao | ..................... | H04B 7/155 455/450 |
| 2011/0305172 A1* | 12/2011 | Dean | ................. | H04B 7/15535 370/279 |
| 2012/0083201 A1* | 4/2012 | Truong | ................. | H04W 52/46 455/9 |
| 2012/0250531 A1* | 10/2012 | Patil | ..................... | H04W 8/005 370/252 |
| 2012/0300695 A1* | 11/2012 | Higuchi | ............. | H04B 7/15535 370/315 |
| 2013/0077502 A1* | 3/2013 | Gainey | .............. | H04B 7/15578 370/252 |
| 2013/0225166 A1* | 8/2013 | Akhtar | ................. | H04W 24/02 455/435.1 |

\* cited by examiner

_US 10,085,222 B1_

WIRELESS COMMUNICATION SYSTEM TO CONTROL TRANSMIT POWER FOR A WIRELESS REPEATER CHAIN

TECHNICAL BACKGROUND

Wireless communication systems exchange user data for user equipment (UEs) to provide various data communication services. The UEs may be phones, computers, media players, intelligent machines, and the like. The data communication services might be audio calls, media streaming, video conferencing, machine-to-machine data transfers, Internet access, or some other computerized information service. Data communication systems use wireless access points to extend the range of their communication services and enable user mobility. The wireless access points perform wireless networking tasks like device handovers, radio interference management, and multipoint coordination.

To extend the wireless footprint even more, wireless repeaters are used between the wireless access points and the UEs. A wireless repeater receives a wireless signal from a UE and then amplifies, filters, and retransmits the signal for receipt by a wireless access point or another wireless repeater. Likewise, a wireless repeater receives a wireless signal from a wireless access point. The wireless repeater amplifies, filters, and retransmits the signal for receipt by the UE or another wireless repeater. Chains or sequences of wireless repeaters are often used to cover roadways and trails with wireless data communication service. Although wireless repeaters are a useful solution to expanding network coverage, each repeater may increase the noise or interference in neighboring cells.

Overview

Examples disclosed herein provide a system, method, hardware, and software to control transmit power for a wireless repeater chain. The method includes a wireless access point wirelessly exchanging data with User Equipment (UEs) over the wireless repeater chain. The method also includes the wireless access point determining interference levels for wireless access points in the neighboring cells, and when the interference levels for at least one of the wireless access points in the neighboring cells exceeds an interference threshold, then the method includes the wireless access point decreasing the transmit power of the wireless repeater chain.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
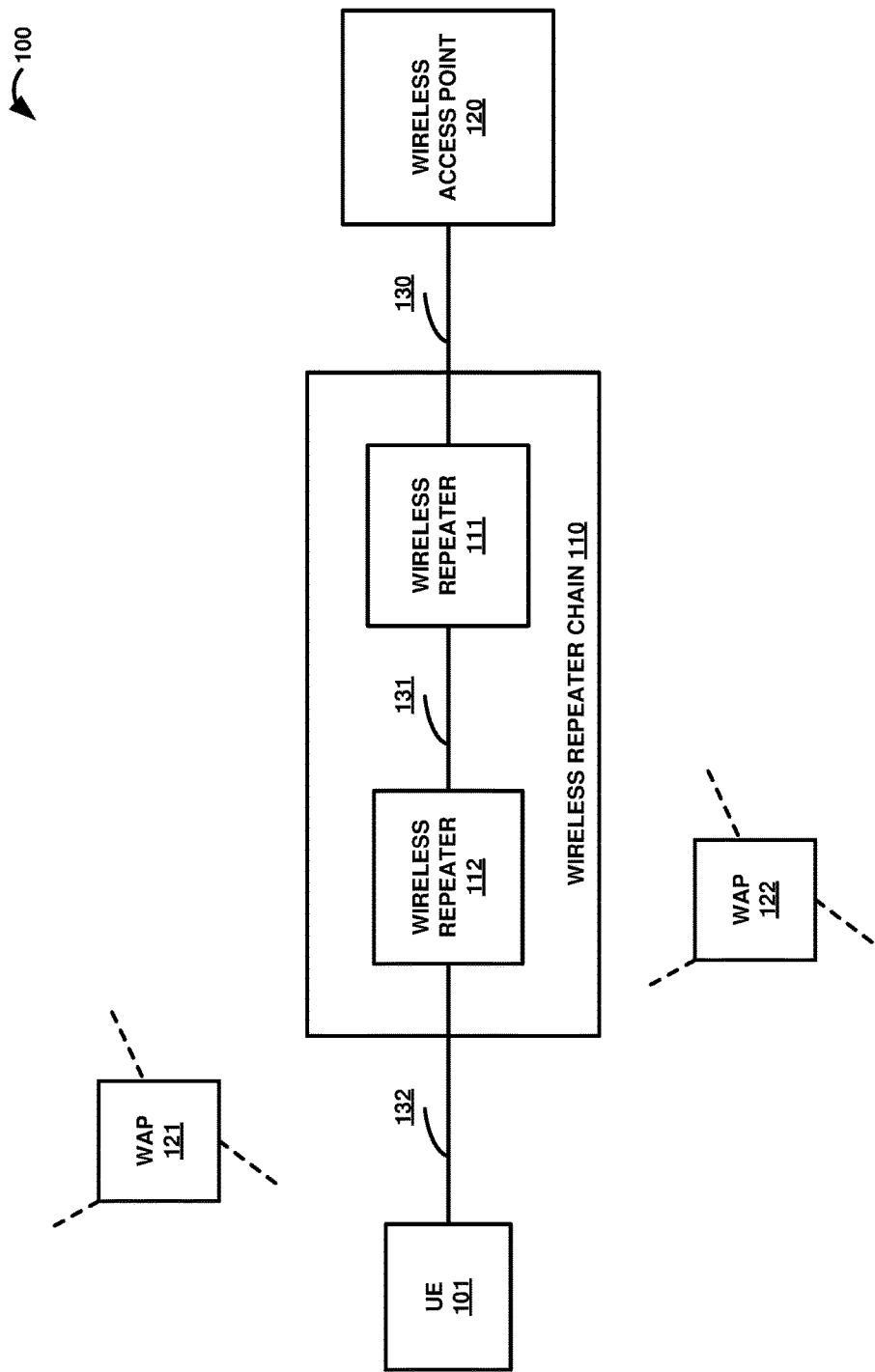
FIG. 1 illustrates a wireless communication system to control the transmit power of a wireless repeater chain.

FIG. 1 illustrates wireless communication system 100 to control the transmit power of wireless repeater chain 110. Wireless communication system 100 includes User Equipment (UE) 101, wireless repeater chain 110, wireless access points 120-122, and communication links 130-132. Wireless repeater chain 110 includes wireless repeaters 111-112. Wireless access points 121-122 are located in neighboring cells to wireless access point 120. UE 101 and wireless repeater 112 communicate over communication link 132. Wireless repeaters 111 and 112 communicate over communication link 131. Wireless access point 120 and wireless repeater chain 110 communicate over communication link 130.

Communication links 130-132 may use any of a variety of communication media, such as air, metal, optical fiber, or any other signal propagation path, including combinations thereof. Also, the links may use any of a variety of communication protocols, such as internet, telephony, optical networking, wireless communication, wireless fidelity, code division multiple access, worldwide interoperability for microwave access, or any other communication protocols and formats, including combinations thereof. Further, the links could be direct links or they might include various intermediate components, systems, and networks.

In operation, wireless access point 120 wirelessly exchanges data with UE 101 over wireless repeater chain 110. Wireless access points 120-122 could be a base station, evolved Node B, computer, network appliance, or some other intelligent machine with RF communication components. Wireless access points 120-122 are made of computer hardware like data communication transceivers, bus interfaces, CPUs, RAM, and data storage. Wireless access points 120-122 have computer software like an operating system, baseband modules, networking modules, and network applications.

Wireless access point 120 determines interference levels for wireless access points 121-122 located in neighboring cells. In some examples, interference levels comprise a signal-to-noise ratio (SNR), signal-to-interference-plus-noise ratio (SINR), jitter, packet loss, network load, number of drops, and any other network measurements—including combinations thereof. When the interference levels for at least one of wireless access points 121-122 exceeds an interference threshold, then wireless access point 120 decreases the transmit power of wireless repeater chain 110.

In some examples, wireless access point 120 may decrease the transmit power for all wireless repeaters 111-112 in wireless repeater chain 110. In other examples, wireless access point 120 may decrease the transmit power for wireless repeaters 111-112 based on their location (i.e. decrease the transmit power of each repeater by different amounts based on their location). In yet other examples, wireless access point 120 may power off specific wireless repeaters in wireless repeater chain 110 (i.e. power off the wireless repeater located at the end of wireless repeater chain 110 or near the cell edge). Wireless access point 120 may also turn off certain frequency bands in wireless repeater chain 110. Although not required, wireless access point 120 may increase the transmit power for wireless repeater chain 110 when the interference levels of wireless access points 121-122 in the neighboring cells falls below the interference threshold.

Figure 2:
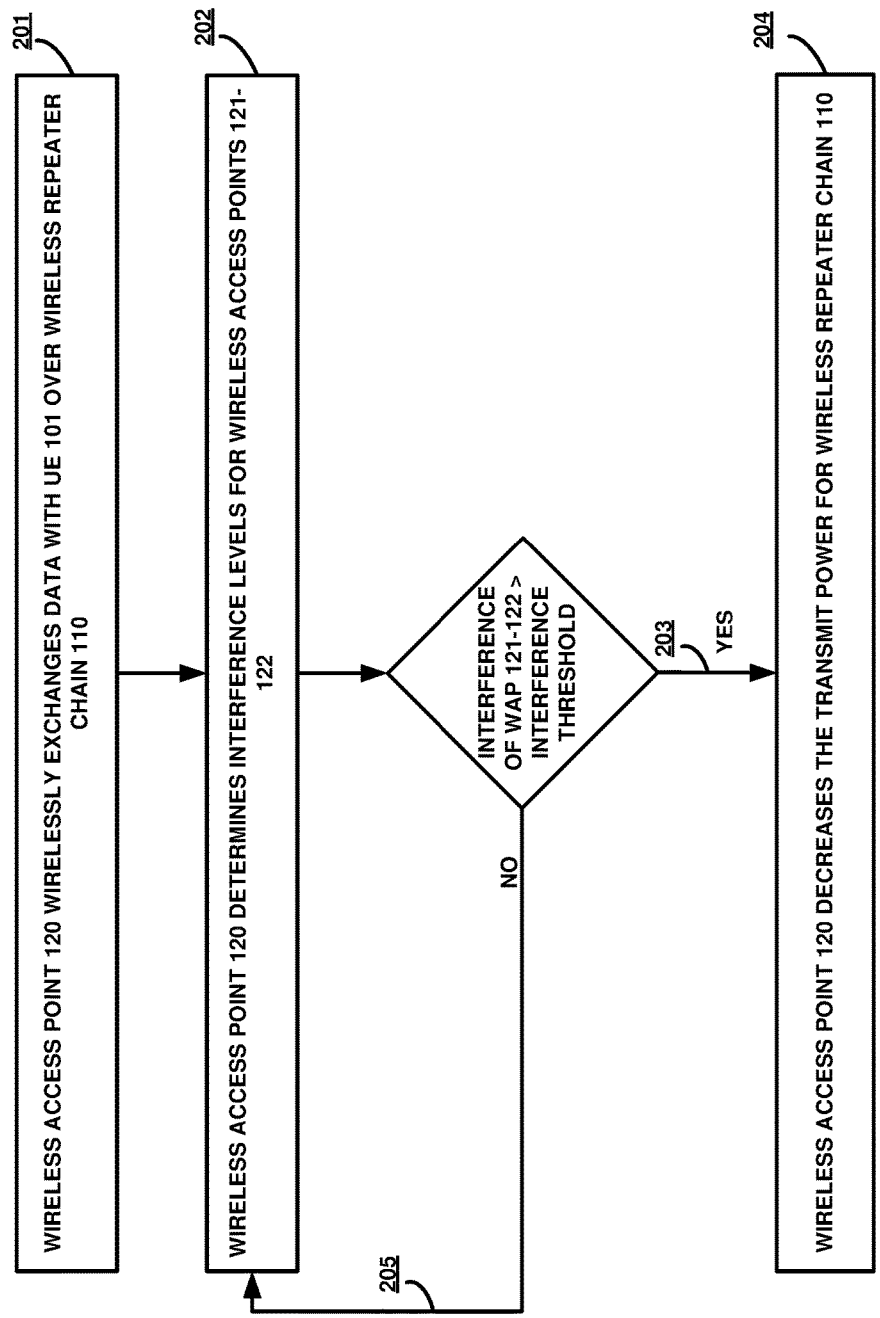
FIG. 2 illustrates the operation of the wireless communication system to control the transmit power of the wireless repeater chain.

FIG. 2 illustrates the operation of wireless communication system 100 to control the transmit power of wireless repeater chain 110. Wireless access point 120 wirelessly exchanges data with UE 101 over wireless repeater chain 110 (step 201). Wireless access point 120 determines interference levels for wireless access points 121-122 (step 202). In some examples, wireless access points 121-122 transmit network information over an X2 connection to wireless access point 120.

When interference levels for at least one of wireless access points 121-122 exceeds an interference threshold (step 203), then wireless access point 120 decreases the transmit power of wireless repeater chain 110 (step 204). When the interference levels for at least one of wireless access points 121-122 does not exceed the interference threshold (step 205), then wireless access point 120 continues to monitor the interference levels of wireless access points 121-122 (step 202).

Figure 3:
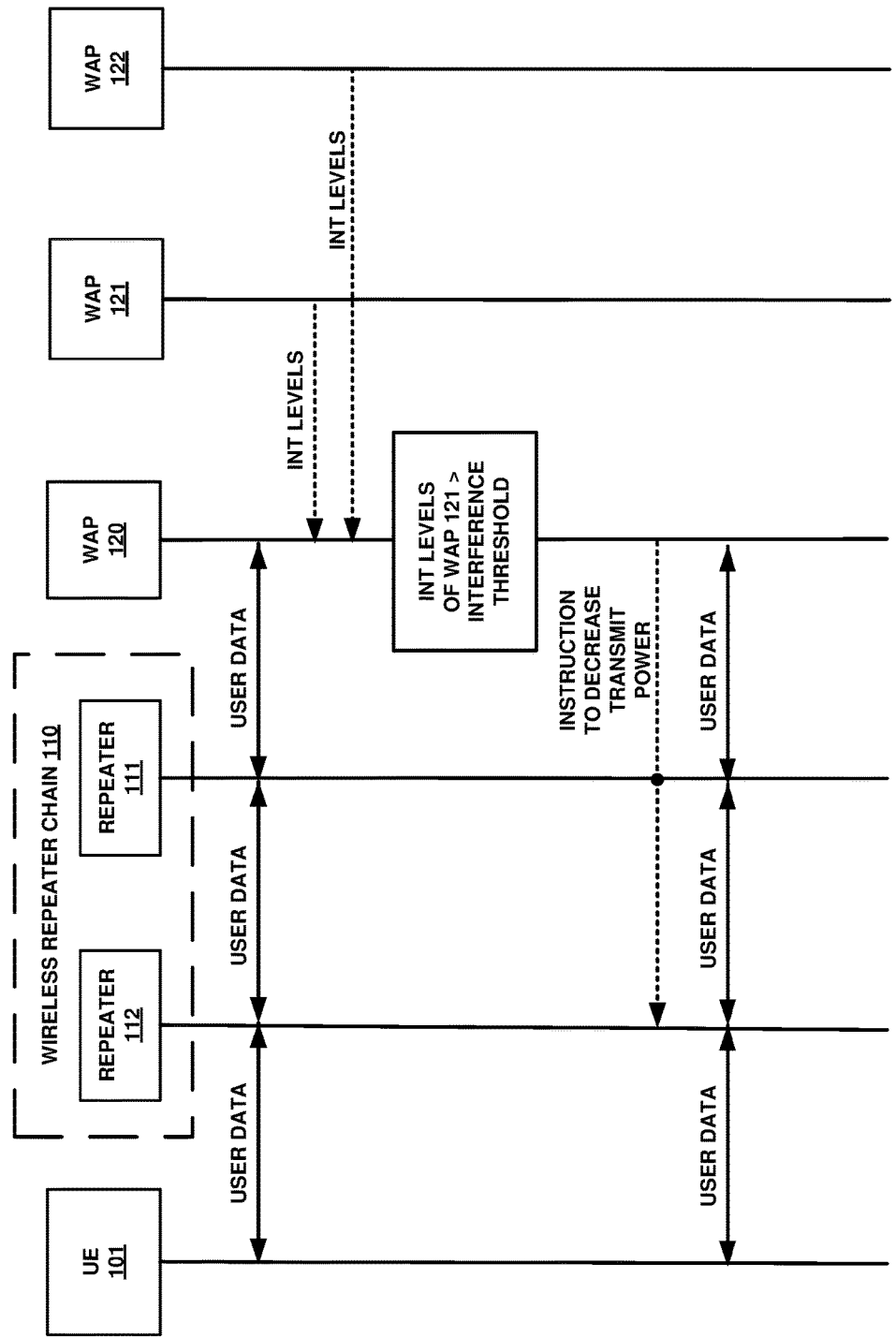
FIG. 3 illustrates the operation of the wireless communication system to control the transmit power of the wireless repeater chain.

FIG. 3 illustrates the operation of wireless communication system 100 to control the transmit power of wireless repeater chain 110. Wireless access point 120 wirelessly exchanges data with UE 101 over wireless repeater chain 110. Wireless access points 121-122 transfer data indicating interference levels to wireless access point 120. Wireless access point 120 determines that interference levels for wireless access point 121-122 exceeds an interference threshold. Wireless access point 120 transfers an instruction to wireless repeater chain 110 to decrease the transmit power. In some examples, wireless access points 121-122 may be connected to their own wireless repeater chains, and the transmit power for the wireless repeater chains in the neighboring cells may also be adjusted based on interference levels. Although not required, UEs may also be instructed to handoff to/from wireless repeater chain 110

Figure 4:
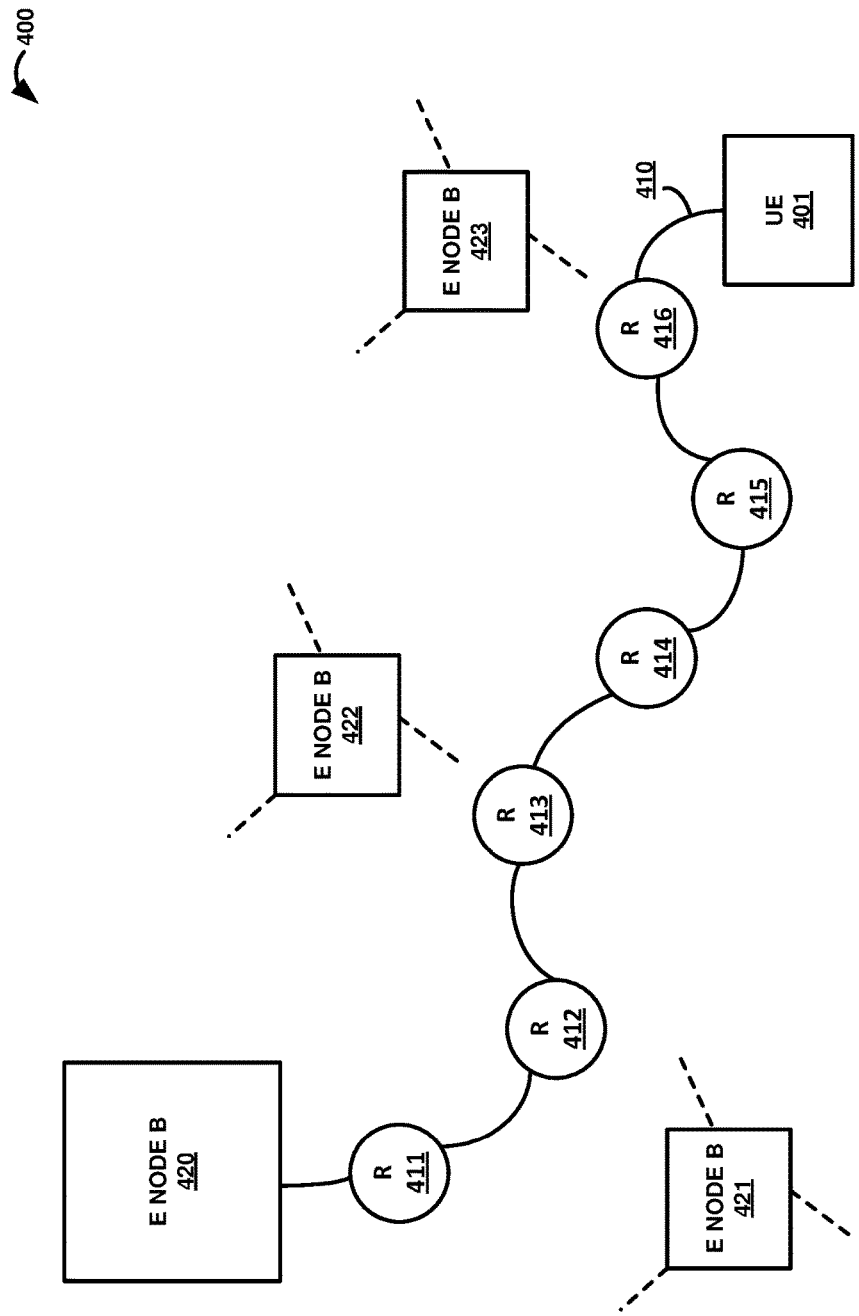
FIG. 4 illustrates a Long Term Evolution communication network to control the transmit power of a wireless repeater chain.

FIG. 4 illustrates Long Term Evolution (LTE) communication system 400 to control the transmit power of wireless repeater chain 410. LTE communication system 400 includes UE 401, wireless repeaters (R) 411-416, which comprises wireless repeater chain 410, eNodeBs 420-423. eNodeBs 421-423 are located in the neighboring cells of eNodeB 420.

In operation, eNodeB 420 wirelessly exchanges data with UE 401 over wireless repeater chain 410. eNodeB 420 determines interference levels for eNodeBs 421-423 in the neighboring cells. When the interference levels for at least one of eNodeBs 421-423 exceeds an interference threshold, then eNodeB 420 decreases the transmit power of wireless repeater chain 410. For example, eNodeB 420 may determine the location of each eNodeB 421-423, and map the interference levels to the location, then eNodeB 420 adjusts the transmit power for the individual wireless repeaters of wireless repeater chain 110 based on the location of the interference.

In one example, the interference level for eNodeB 422 exceeds the interference threshold, but the interference levels for eNodeBs 421 and 423 do not exceed the interference threshold, so eNodeB 420 decreases the transmit power for wireless repeater 413, which is located near to eNodeB 422. In another example, eNodeB 420 decreases the transmit power of wireless repeater 416, at the end of wireless repeater chain 410, since interference in neighboring cells can result in radio link failures at cell edge.

Figure 5:
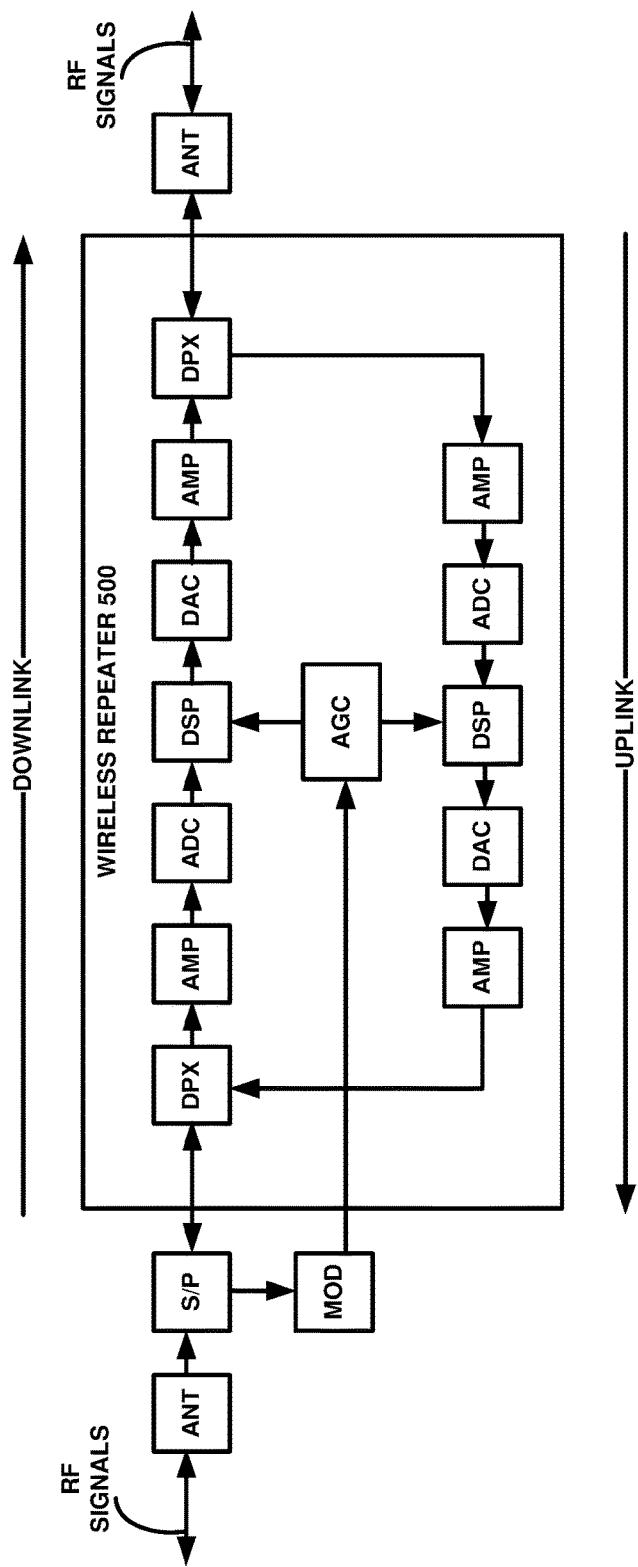
FIG. 5 illustrates an example of a wireless repeater.

FIG. 5 illustrates wireless repeater 500. Wireless repeater 500 is an example of wireless repeaters 111-112 and 411-416, although wireless repeaters 111-112 and wireless repeaters 411-416 may use alternative configurations and operations. Wireless repeater 500 includes RF signals with multiple frequency components, antenna systems, Automatic Gain Control (AGC) systems, a splitter (S/P), and a modem (MOD). Wireless repeater 500 also includes duplexers (DPX), amplifiers (AMP), analog-to-digital converters (ADC), digital signaling processing systems (DSP), and digital-to-analog converters (DAC).

In operation, RF signals that comprise multiple frequency components are input into wireless repeater 500. RF signals may be uplink signals, downlink signals, or synthetic signals inserted by wireless repeater 500, received from another wireless repeater, or received from a wireless access point. The RF signals are then delivered to the splitter, which splits the RF signals and transfers the split RF signals to a modem and a duplexer. The duplexer transfers the RF signals to the amplifier.

At this point in the process, RF signals are transferred to an analog-to-digital converter by the amplifier and the converter transfers the converted RF signals to a DSP. The DPS processes frequency responses and determines frequency gains. The DPS can also apply received frequency gains. After processing, the RF signals are transferred to a digital-to-analog convertor, which converts the RF signals and transfers the converted RF signals to an amplifier.

The amplifier then transfers the RF signals to a duplexer that transfers the RF signals to another antenna system. Downlink RF signals go from left to right and uplink RF signals go from right to left. The modem transfers the RF signals to the AGC system, which processes the RF signals and determines whether to apply AGC.

Figure 6:
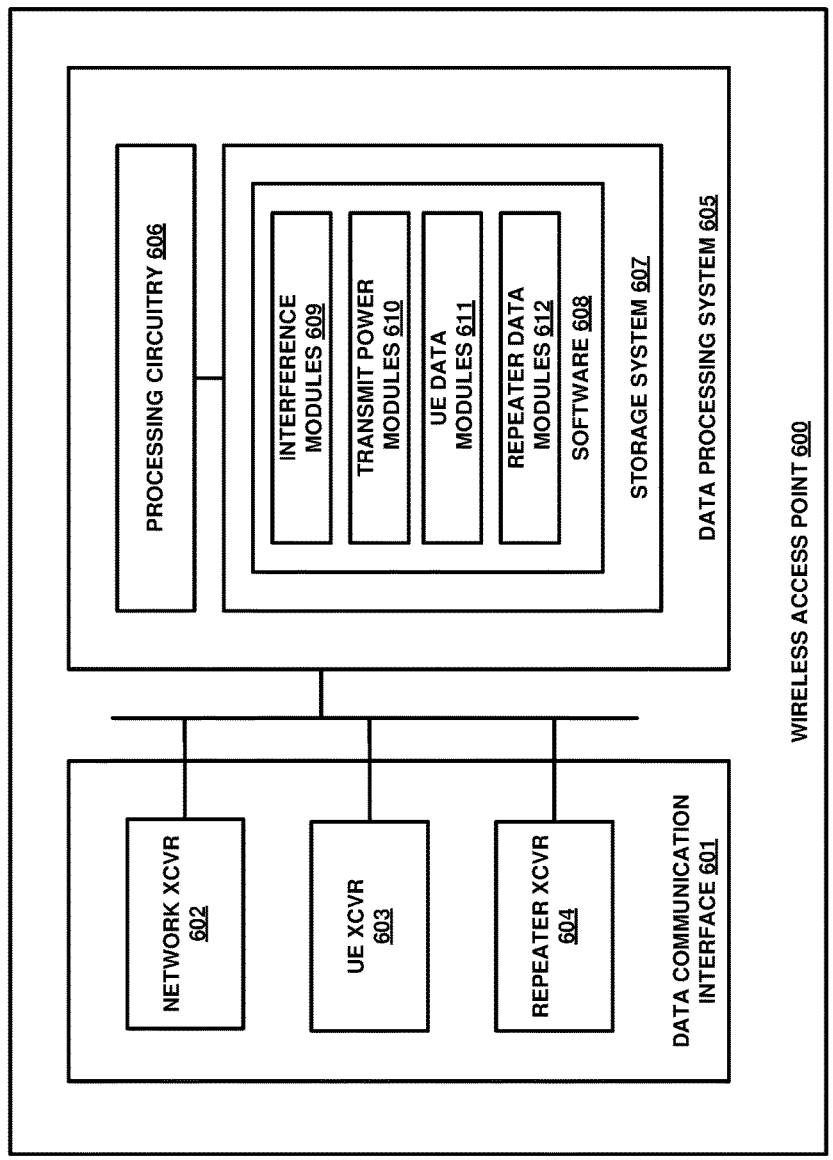
FIG. 6 illustrates an example of a wireless access point to control the transmit power of a wireless repeater chain.

FIG. 6 illustrates wireless access point 600 to control the transmit power of a wireless repeater chain. Wireless access point 600 is an example of wireless access points 120-122 and eNodeBs 420-423. Although these systems may use alternative configurations and operations. Wireless access point 600 comprises data communication interface 601 and data processing system 605. Data processing system 605 includes processing circuitry 606 and storage system 607 that stores software 608. Software 608 comprises software modules 609-611.

Data communication interface 601 comprises network transceiver 602, UE transceiver 603, and repeater transceiver 604. Network transceiver 602 allows wireless access point 600 to communicate with a wireless communication network. UE transceiver 603 allows wireless access point 600 to communicate directly with UEs. Repeater transceiver 604 allows wireless access point 600 to communicate with wireless repeater chains, such as wireless repeater chains 110 and 410.

Data communication interface 601 components that communicate over communication links such as network cards, ports, RF transceivers, processing circuitry and software, or some other communication components. Data communication interface 601 may be configured to communicate over metallic, wireless, or optical links. Data communication interface 601 may be configured to use TDM, IP, Ethernet, optical networking, wireless protocols, communication signaling, or some other communication format—including combinations thereof. Data communication interface 601 may receive and transfer user communication data over the uplink and downlink communication channels, respectively. Data communication interface 601 may also control the transmit power of a wireless repeater chain.

Processing circuitry 606 comprises microprocessor and other circuitry that retrieves and executes operating software 608 from memory 607. Processing circuitry 606 may comprise a single device or could be distributed across multiple devices—including devices in different geographic areas. Processing circuitry 606 may be embedded in various types of equipment. Examples of processing circuitry 606 include central processing units, application specific processors, logic devices, and/or any type of computer processing devices—including combinations thereof.

Storage system 607 comprises a non-transitory computer readable storage medium readable by processing system 606 and capable of storing software 608, such as a disk drive, flash drive, data storage circuitry, or some other hardware memory apparatus—including combinations thereof. Storage system 607 can include volatile and/or non-volatile, removable and non-removable media implemented in any method or technology for storage of information, such as computer readable instructions, data structures, program modules, or other data—including combinations thereof. Storage system 607 may comprise a single device or could be distributed across multiple devices—including devices in different geographic areas. Storage system 607 may be embedded in various types of equipment. In some examples, a computer apparatus could comprise storage system 607 and software 608.

Software 608 comprises computer programs, firmware, or some other form of machine-readable processing instructions. Software 608 may include an operating system, utilities, drivers, network interfaces, applications, or some other type of software. In this example, software 608 comprises interference module 609, transmit power module 610, UE data module 611, and repeater data module 612. Although software 608 could have alternative configurations in other examples. Software 608 may be implemented in program instructions and may be executed by processing circuitry 606. Software 608 may include additional processes, programs, or components, such as operating system software, database software, or application software—including combinations thereof. Software 608 may also comprise firmware or some other form of machine-readable processing instructions executable by processing circuitry 606.

When executed, software 608 directs processing circuitry 606 to operate as described herein to control the transmit power of a wireless repeater chain. In particular, interference module 609 directs processing circuitry 606 to determine interference levels for neighboring cells and compares the interference levels to an interference threshold. Transmit power module 610 directs processing circuitry 606 to control transmit power for a wireless repeater chain. UE data module 611 directs processing circuitry 606 to transmit user data with UEs. Repeater module 612 directs processing circuitry 606 to transmit user data with wireless repeaters/a wireless repeater chain.

Referring back to FIG. 1, UE 101 comprises Radio Frequency (RF) communication circuitry and an antenna. The RF communication circuitry typically includes an amplifier, filter, modulator, and signal processing circuitry. UE 101 may also include a user interface, memory device, software, processing circuitry, or some other communication components. UE 101 may be a telephone, computer, e-book, mobile Internet appliance, wireless network interface card, media player, game console, or some other wireless communication apparatus—including combinations thereof.

Wireless access point 120 comprises RF communication circuitry and an antenna. The RF communication circuitry typically includes an amplifier, filter, RF modulator, and signal processing circuitry. Wireless access point 120 may also comprise a router, server, memory device, software, processing circuitry, cabling, power supply, network communication interface, structural support, or some other communication apparatus. Wireless access point 120 could be a base station, eNodeB, wireless repeater, Internet access node, telephony service node, wireless data access point, or some other wireless communication system—including combinations thereof.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless access point to control transmit power for a wireless repeater chain, the method comprising:
   the wireless access point wirelessly exchanging data with User Equipment (UEs) over the wireless repeater chain;
   the wireless access point determining interference levels for other wireless access points in multiple neighboring cells;
   the wireless access point mapping the interference levels for the other wireless access points in the multiple neighboring cells to an aggregated interference location;
   the wireless access point selecting individual transmit powers for individual ones of the wireless repeaters based on the aggregated interference location; and
   the wireless access point decreasing the transmit power of the individual wireless repeaters in the wireless repeater chain to the selected individual transmit powers.

2. The method of claim 1 wherein decreasing the transmit power for the wireless repeater chain comprises determining a location of individual repeaters of the wireless repeater chain and decreasing the transmit power for the individual repeaters based on their location.

3. The method of claim 1 wherein decreasing the transmit power for the wireless repeater chain comprises decreasing the transmit power for all repeaters in the wireless repeater chain.

4. The method of claim 1 wherein decreasing the transmit power for the wireless repeater chain comprises decreasing the transmit power for a wireless repeater located at the end of the wireless repeater chain.

5. The method of claim 1 wherein decreasing the transmit power for the wireless repeater chain comprises determining a location of individual wireless repeaters of the wireless repeater chain and powering down at least one of the individual wireless repeaters based on their location.

6. The method of claim 1 wherein decreasing the transmit power for the wireless repeater chain comprises turning off frequency bands in individual wireless repeaters in the wireless repeater chain.

7. The method of claim 1 wherein decreasing the transmit power for the wireless repeater chain comprises determining a location of individual wireless repeaters of the wireless repeater chain and turning off frequency bands in individual wireless repeaters in the wireless repeater chain based on their location.

8. The method of claim 1 wherein the wireless access point comprises a Long Term Evolution (LTE) eNodeB.

9. A wireless communication systems to control transmit power over a wireless repeater chain, the wireless communication system comprising:
the wireless repeater chain configured to wirelessly exchange data with User Equipment (UE);
a first wireless access point configured to wirelessly exchange the data with the wireless repeater chain;
the first wireless access point configured to determine interference levels for second wireless access points in multiple neighboring cells; and
the first wireless access point configured to map the interference levels for the second wireless access points in the multiple neighboring cells to an aggregated interference location, select individual transmit powers for individual ones of the wireless repeaters based on the aggregated interference location, and decrease the transmit power of the individual wireless repeaters in the wireless repeater chain to the selected individual transmit powers.

10. The wireless communication system of claim 9 wherein the first wireless access point is configured to determine a location of individual wireless repeaters of the wireless repeater chain and decrease the transmit power for the individual wireless repeaters based on their location.

11. The wireless communication system of claim 9 wherein the first wireless access point is configured to decrease the transmit power for all repeaters in the wireless repeater chain.

12. The wireless communication system of claim 9 wherein the first wireless access point is configured to decrease the transmit power for a wireless repeater located at the end of the wireless repeater chain.

13. The wireless communication system of claim 9 wherein the first wireless access point is configured to determine a location of individual wireless repeaters of the wireless repeater chain and power down at least one of the individual wireless repeaters based on their location.

14. The wireless communication system of claim 9 wherein the first wireless access point is configured to turn off frequency bands in individual wireless repeaters in the wireless repeater chain.

15. The wireless communication system of claim 9 wherein the first wireless access point is configured to determine a location of individual wireless repeaters of the wireless repeater chain and turn off frequency bands in individual wireless repeaters in the wireless repeater chain.

16. The wireless communication system of claim 9 wherein the wireless access point comprises a Long Term Evolution (LTE) eNodeB.

* * * * *